United States Patent [19]

Kaku et al.

[11] Patent Number: 4,630,126
[45] Date of Patent: Dec. 16, 1986

[54] METHOD OF SIGNAL TRANSMISSION WITH SELECTED SIGNAL TRANSMISSION RATE

[75] Inventors: Takashi Kaku, Tama; Ryoji Okita; Masayoshi Inoue, both of Kawasaki; Shozo Kudo, Yokohama, all of Japan

[73] Assignees: Fujitsu Limited, Kawasaki; Ricoh Company, Ltd., Tokyo, both of Japan

[21] Appl. No.: 645,729

[22] Filed: Aug. 30, 1984

[30] Foreign Application Priority Data

Aug. 30, 1983 [JP] Japan .................... 58-158221

[51] Int. Cl.⁴ .............. H04N 1/40; H04N 1/52; H04N 1/17
[52] U.S. Cl. ...................... 358/280; 358/288; 358/257; 375/34; 375/58
[58] Field of Search .......... 375/58, 34, 121; 370/84; 371/5; 358/256, 257, 288, 280

[56] References Cited

U.S. PATENT DOCUMENTS 4,153,916  5/1979  Miwa et al. .................. 358/288

FOREIGN PATENT DOCUMENTS 53-8010  1/1978  Japan .
57-5465  1/1982  Japan .

Primary Examiner—John W. Shepperd
Assistant Examiner—John K. Peng
Attorney, Agent, or Firm—Armstrong, Nikaido, Marmelstein & Kubovcik

[57] ABSTRACT

A method for transmitting a signal with a signal transmission rate selected from a plurality of signal transmission rates applicable to a facsimile transmission system. The distortion amount of a distortion measurement signal transmitted from a transmitting equipment is measured at a receiving equipment on the basis of the variation in the received distortion measurement signal. The distortion allowance range to which the measured distortion amount belongs is decided on the basis of the result of the measurement of the distortion amount. The transmission of the working signals is carried out with a transmission rate corresponding to the result of the decision of the distortion allowance range.

7 Claims, 11 Drawing Figures

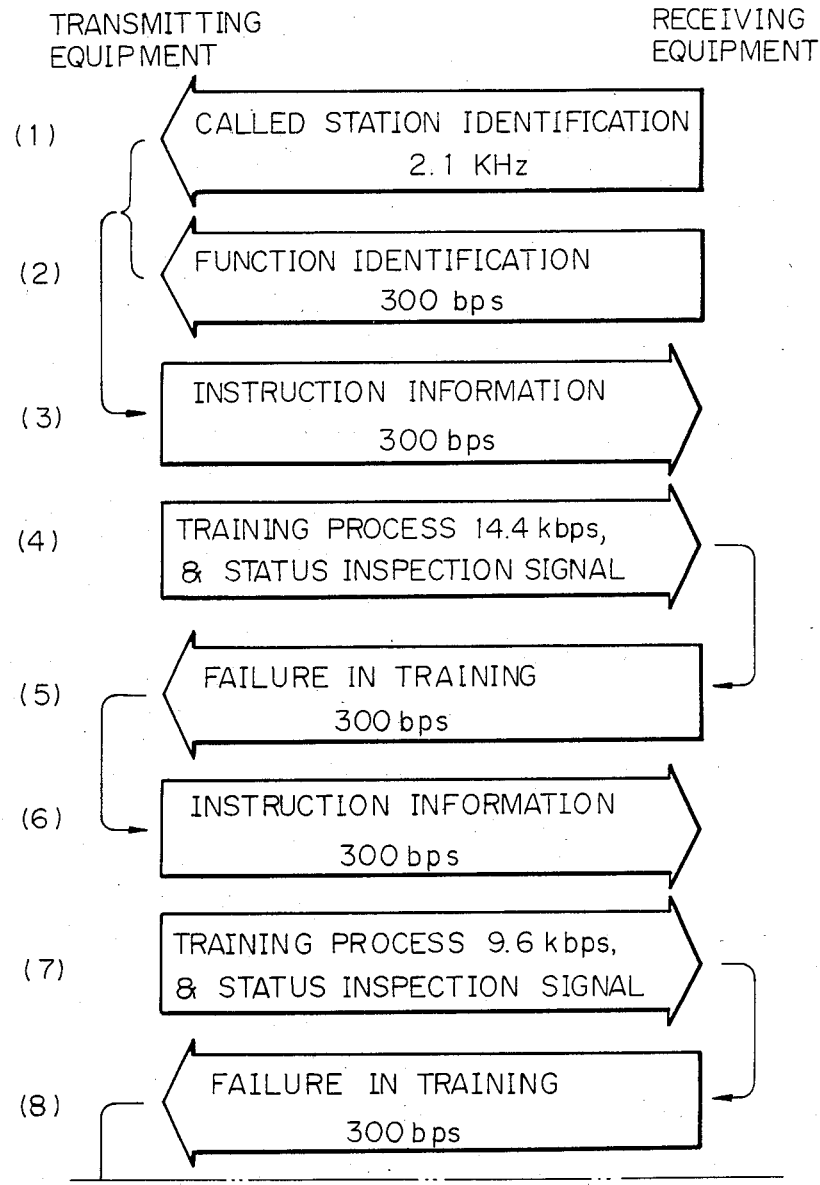

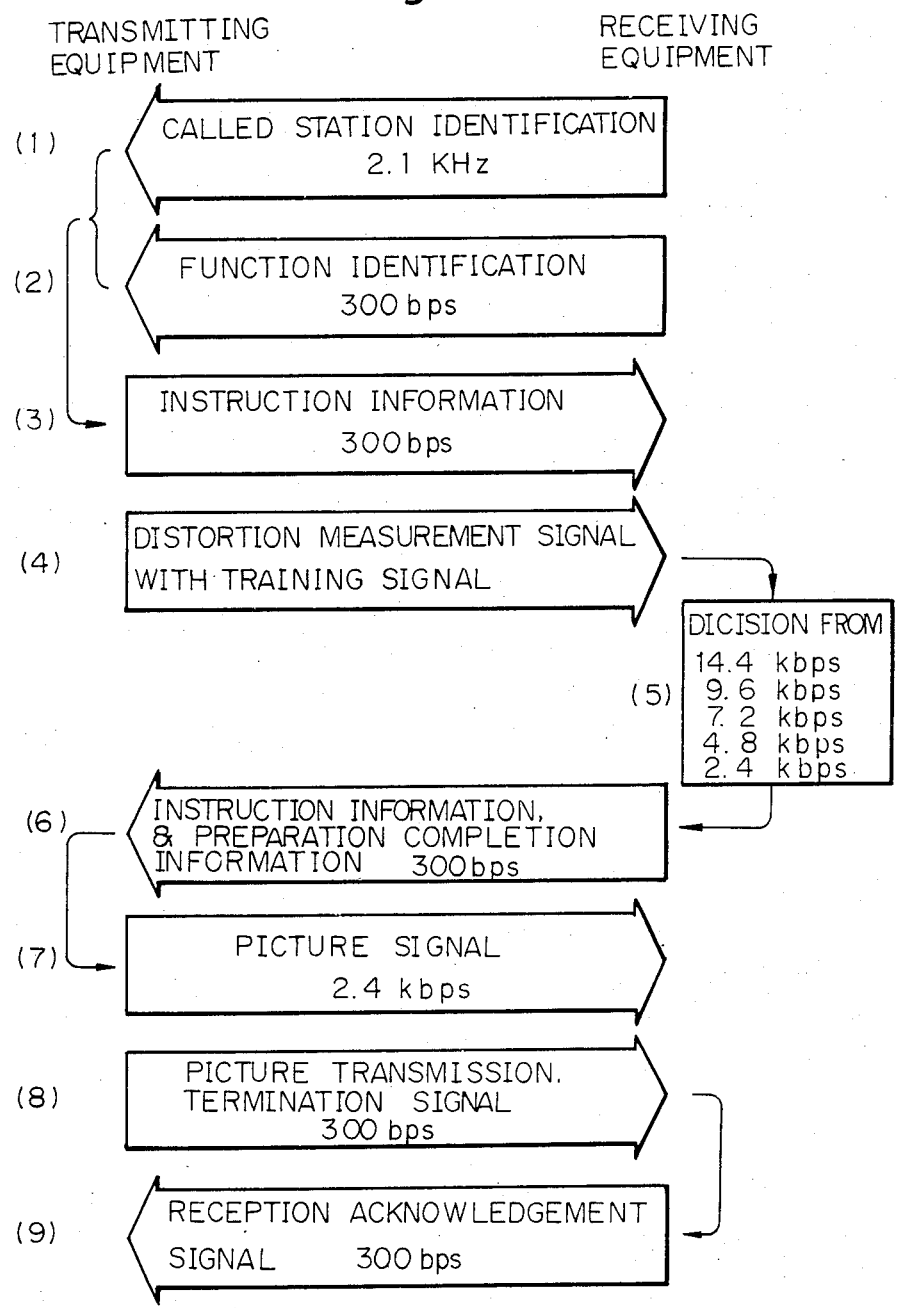

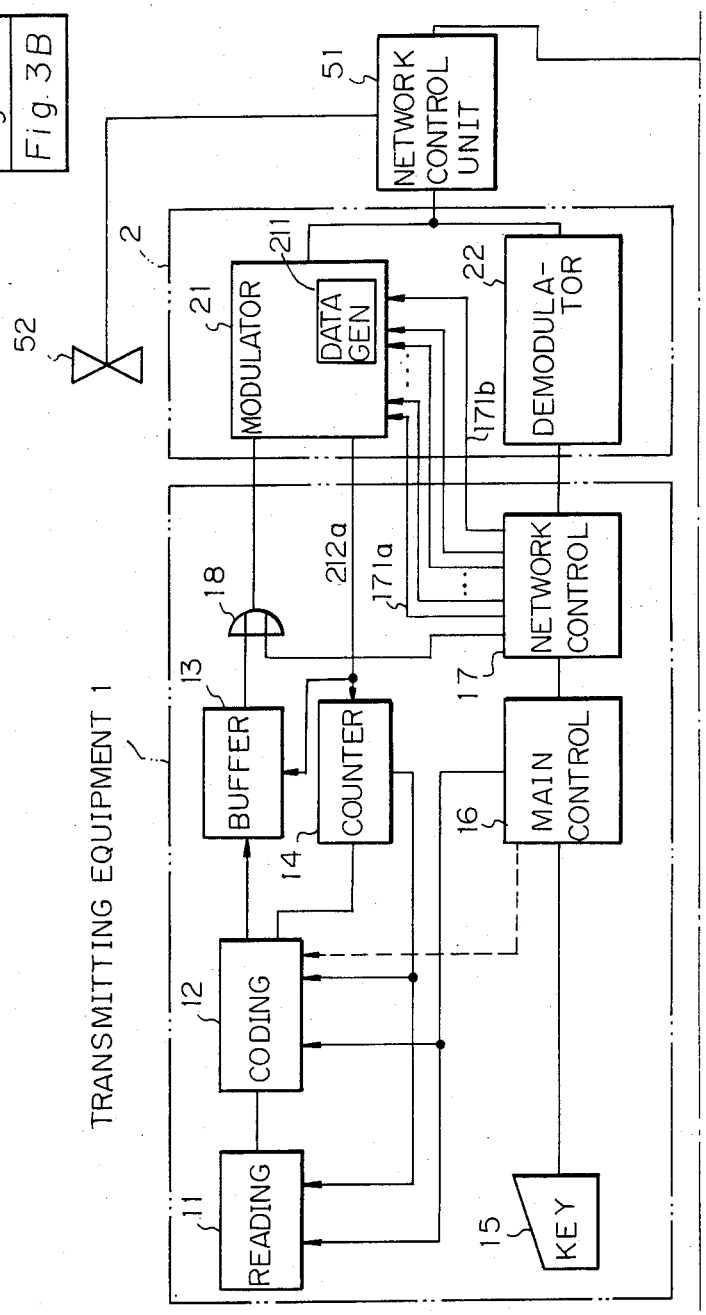

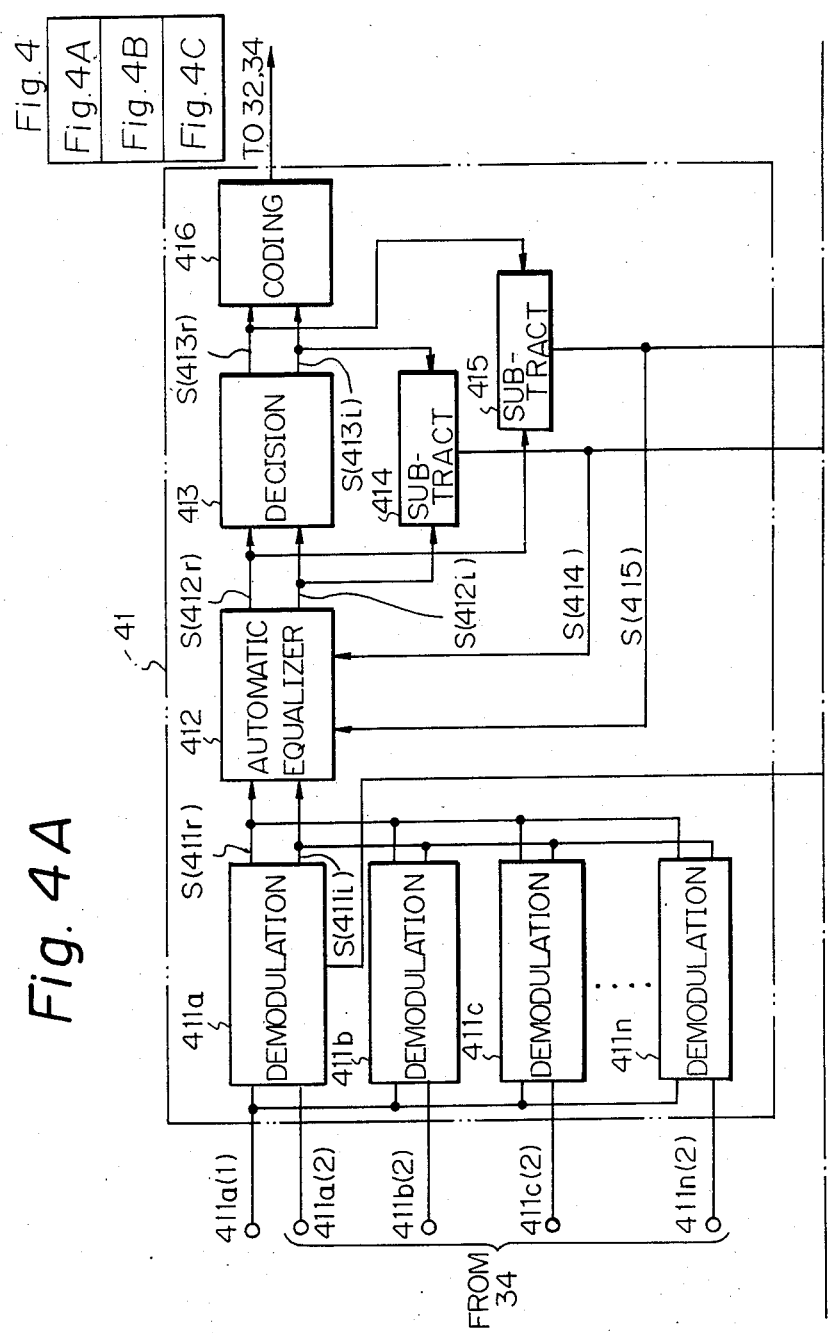

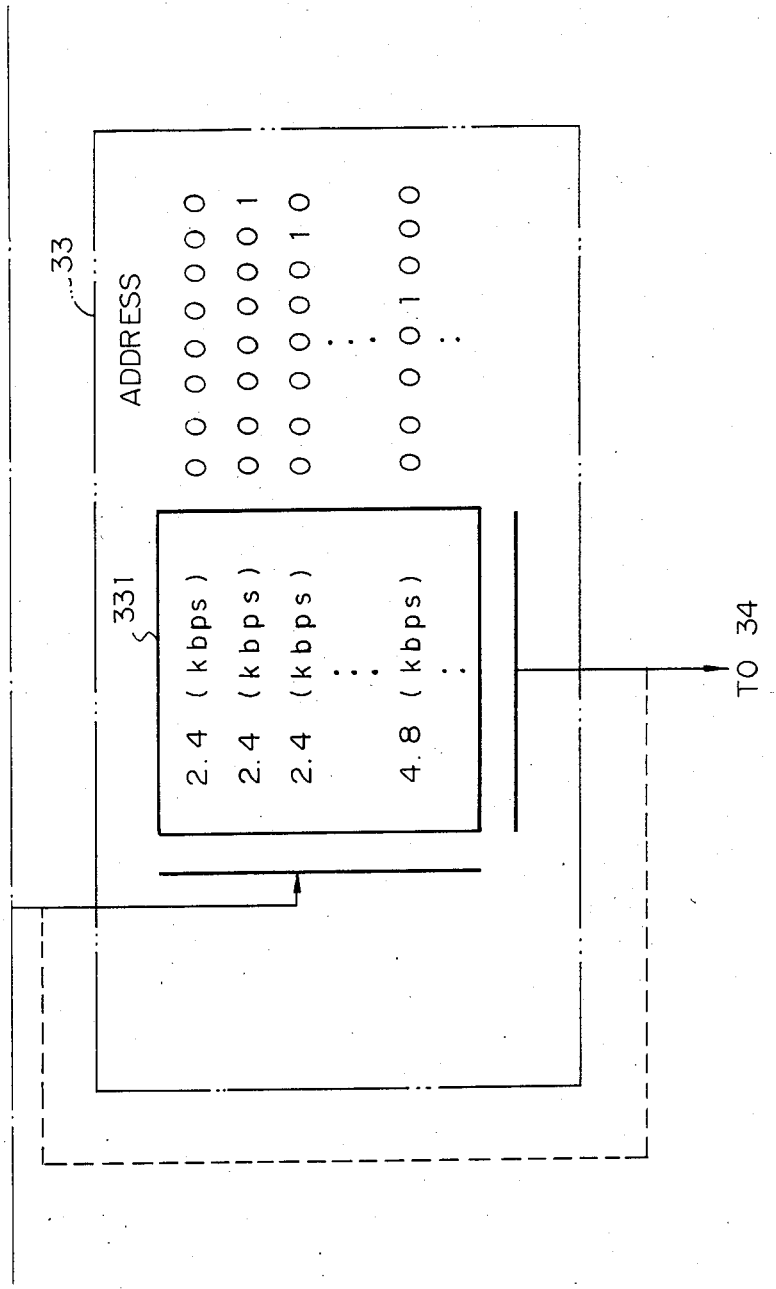

METHOD OF SIGNAL TRANSMISSION WITH SELECTED SIGNAL TRANSMISSION RATE

BACKGROUND OF THE INVENTION

1. Field of the Invention

The present invention relates to a method for transmitting a signal with a signal transmission rate selected from a plurality of signal transmission rates. The method according to the present invention is used, for example, in a facsimile transmission system.

2. Description of the Prior Art

In general, in facsimile systems using the telephone exchange network, modulation/demodulation devices, called MODEMs, having a plurality of signal transmission rates are used. The transmission rate with which the picture signal transmission can be carried out at the highest speed with the least distortion of picture signal is selected before the start of the transmission, and the transmission of the picture signal is carried out with the above-selected transmission rate.

However, in the prior art facsimile system, a problem arises wherein the decision of the suitable signal transmission rate sometimes takes a considerable length of time, so that the start of the transmission of the picture signal with such a decided transmission rate tends to be delayed.

Some of the prior art facsimile transmission systems are disclosed in, for example, the following publications:

(1) Japanese Unexamined Patent Publication (Kokai) No. 53-8010; and (2) Japanese Unexamined Patent Publication (Kokai) No. 57-5465.

SUMMARY OF THE INVENTION

It is the object of the invention to provide an improved facsimile transmission system in which the length of time required before the decision of the transmission rate is made, and accordingly, before the commencement of the transmission of the picture signal, can be reduced.

In accordance with the present invention, there is provided a method for transmitting a signal with a signal transmission rate selected from a plurality of signal transmission rates comprising the steps of: predetermining a plurality of distortion allowance ranges in correspondence with the ranges of the signal transmission rate; transmitting a distortion measurement signal from a transmitting equipment to a receiving equipment; measuring the distortion amount of the distortion measurement signal, at the receiving equipment, on the basis of the variation in the transmitted distortion measurement signal received by the receiving equipment; deciding a distortion allowance range to which the measured distortion amount belongs on the basis of the result of the measurement of the distortion amount, at either the receiving equipment, or at the transmitting equipment on the basis of the measured distortion amount transmitted from the receiving equipment; and starting the transmission of the signal with a transmission rate corresponding to the result of the decision of the distortion allowance range.

BRIEF DESCRIPTION OF THE DRAWINGS

In the drawings, FIGS. 1A and 1B illustrate a sequence of signal transmission processes in a prior art facsimile transmission;

FIG. 2 illustrates a sequence of signal transmission processes according to an embodiment of the present invention;

FIGS. 3A and 3B are a schematic block diagram of a system for carrying out the sequence of signal transmission processes according to an embodiment of the present invention;

FIGS. 4A, 4B and 4C show the structure of the demodulator, the quality extraction circuit, and the decision portion shown in FIG. 3;

DESCRIPTION OF THE PREFERRED EMBODIMENTS

Figure 1B:
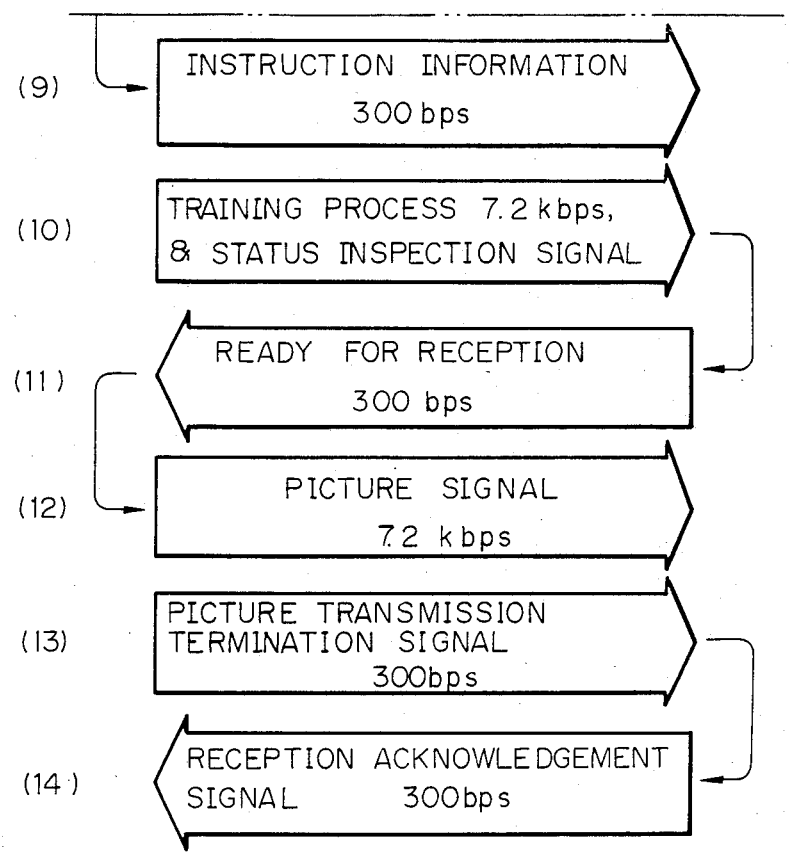

In relation to the description of the preferred embodiments of the present invention, a sequence of signal transmission processes in a prior art facsimile transmission will be explained with reference to FIG. 1.

Step (1): In reply to the call by a telephone through a telephone transmission and exchange network from the transmitting equipment, the receiving equipment transmits a single tone signal of 2.1 kHz, indicating that the called terminal equipment is a facsimile receiving equipment, from the receiving equipment through the MODEM for the receiving equipment to the transmitting equipment.

Step (2): The receiving equipment transmits the function identification signal of 300 bps (bits per second) through the MODEM for the receiving equipment to the transmitting equipment. The function identification signal indicates the function of the receiving equipment, such as the transmission rate of the MODEM for the receiving equipment, for example 14.4 kbps, 9.6 kbps, 7.2 kbps, 4.8 kbps, or 2.4 kbps; the kinds of picture signal coding system capable of being decoded by the receiving equipment, for example, the ordinary system, the MH system, or the MR system; the maximum size of paper sheet capable of being used for receiving, for example B4, A4, or B5; and the like.

The transmitting equipment acknowledges that the receiving equipment is a facsimile receiving equipment by receiving the single tone signal of 2.1 kHz transmitted from the receiving equipment.

Upon receipt of the function identification signal of 300 bps transmitted from the receiving equipment, the transmitting equipment selects the function by which the transmission with the shortest time can be achieved from the functions of the receiving equipment which coincide with the functions of the transmitting equipment, and also selects the size of the paper sheet.

For example, the transmitting equipment selects 14.4 kbps as the transmission rate, the MR system as the picture signal coding system, and B4 as the paper sheet.

Step (3): Based on the result of the above-described acknowledgement and selection, the transmitting equipment transmits an instruction information, including the indication of 14.4 kbps as the transmission rate, to the receiving equipment as the function which should be adopted as the function for the following transmissions.

Step (4): The transmitting equipment transmits a training signal of 14.4 kbps to the receiving equipment.

By receiving the instruction information transmitted from the transmitting equipment, the receiving equipment becomes operable in the state of the selected function indicated in the received function information.

By receiving the training signal transmitted from the transmitting equipment, the receiving equipment is set up on the basis of the received training signal.

The transmitting equipment also transmits a training inspection signal to the receiving equipment, for inspecting the state of training.

Upon receipt of the training inspection signal transmitted from the transmitting equipment, the receiving equipment demodulates the transmitted training inspection signal into the facsimile receiver of the receiving equipment, and decides whether or not the receiving equipment can receive the picture signal correctly with the transmission rate indicated in the instruction information on the basis of the demodulated signal.

Step (5): When the result of the above-described decision is NO, the receiving equipment transmits a failure in training signal to the transmitting equipment.

Step (6): Upon receipt of the failure in training signal from the receiving equipment, the transmitting equipment selects the transmission rate (i.e., carries out falling-back) which is one level lower than the former transmission rate (for example, 9.6 kbps which is one level lower than 14.4 kbps is selected), and transmits the instruction information including the indication of 9600 bps as the selected transmission rate to the receiving equipment.

Step (7): The transmitting equipment again transmits a training signal of 9.6 kbps and a status inspection signal to the receiving equipment.

Steps (8), (9), and (10): The above-mentioned steps (5), (6) and (7) are repeated.

Step (11): If it is decided that the picture signal can be received correctly with the transmission rate indicated in the instruction information, the receiving equipment transmits the ready for reception signal to the transmitting equipment.

Step (12): The transmitting equipment transmits the picture signal with the above approved transmission rate (for example, 7.2 kbps) to the receiving equipment.

Step (13): The transmitting equipment transmits a picture transmission termination signal to the receiving equipment.

Step (14): The receiving equipment transmits a reception acknowledgement signal to the transmitting equipment.

In the prior art facsimile transmission process described above, a problem arises wherein, as the degree of distortion of the signal on the transmission line is increased and as the deterioration of the quality of the transmission line with MODEMs for the transmitting equipment and the receiving equipment is increased, the number of repetitions of the sequence of the steps (3), (4), (5), and (6) is increased, so that a relatively long time is taken until the commencement of the transmission of the picture signal.

The sequence of signal transmission processes in the facsimile transmission system according to an embodiment of the present invention is shown in FIG. 2.

Step (1): In reply to the call by a telephone through a telephone transmission and exchange network from the transmitting equipment, the receiving equipment transmits a single tone signal of 2.1 kHz, indicating that the called terminal equipment is a facsimile receiving equipment, from the receiving equipment through the MODEM for the receiving equipment to the transmitting equipment.

Step (2): The receiving equipment transmits the function identification signal of 300 bps (bits per second) through the MODEM for the receiving equipment to the transmitting equipment. The function identification signal indicates the function of the receiving equipment, such as the transmission rate of the MODEM for the receiving equipment, for example 14.4 kbps, 9.6 kbps, 7.2 kbps, 4.8 kbps, or 2.4 kbps; the kinds of picture signal coding system capable of being decoded by the receiving equipment, for example the ordinary system, the MH system, or the MR system; the maximum size of paper sheet capable of being used for receiving, for example B4, A4, or B5; and the like.

The transmitting equipment acknowledges that the receiving equipment is a facsimile receiving equipment by receiving the single tone signal of 2.1 kHz transmitted from the receiving equipment.

Upon receipt of the function identification signal of 300 bps transmitted from the receiving equipment, the transmitting equipment selects the function by which the transmission with the shortest time can be achieved from the functions of the receiving equipment which coincide with the functions of the transmitting equipment, excluding the selection of the transmission rate.

Step (3): Based on the result of the above-described acknowledgement and selection, the transmitting equipment transmits an instruction information to the receiving equipment as the function which should adopted as the function for the following transmissions.

Step (4): The transmission equipment transmits a distortion measurement signal for setting-up the MODEM for the receiving equipment to the state of being capable of reception and enabling the decision in the receiving equipment of the degree of the distortion to the receiving equipment. The distortion measurement signal includes a training signal necessary for the MODEM for the receiving equipment.

For transmitting the distortion measurement signal, a transmission rate is used other than the transmission rates used for transmitting the picture signal which are adopted in V29 of the CCITT recommendations as 9.6 kbps and 7.2 kbps, or in V27 ter of the CCITT recommendations as 4800 bps and 2.4 kbps. For example, the transmission rate of 4.8 kbps which is adopted in V29 of the CCITT recommendations as the transmission rate for data transmission. It is generally known that the transmission rate of 4.8 kbps for data transmission ensures a high noise endurance and has a wide range of detection of the quality of the transmission line. Hence, this transmission rate is suitable for the transmission of the training signal.

The signal pattern for the measurement of the quality of the transmission line concerning the distortion, included in the training signal, is preferably a pattern by the pseudo random code.

The receiving equipment selects the function indicated in the received instruction information and brings the receiving equipment to the receiving state under the thus selected function.

The receiving equipment sets up the MODEM for the receiving equipment with the training signal transmitted with the distortion measurement signal from the transmitting equipment. Also, the MODEM for the receiving equipment reproduces the received signal to generate a signal for the distortion degree indication.

Step (5): On the basis of this generated distortion degree indication signal, the receiving equipment selects the transmission rate with which the picture signal can be transmitted with the highest rate and the least error.

Step (6): The receiving equipment transmits information of the result of this selection of the transmission rate, for example, 2.4 kbps, as an instruction information, and information of the completion of preparation for reception to the transmitting equipment.

Step (7): Upon receipt of the instruction information and the preparation completion information, the transmitting equipment sets up the MODEM for the transmitting equipment with the transmission rate indicated in the instruction information transmitted from the receiving equipment.

The transmitting equipment then starts the transmission of the picture signal with the thus adopted transmission rate.

Step (8): The transmitting equipment transmits a picture transmission termination signal to the receiving equipment.

Step (9): The receiving equipment transmits a reception acknowledgement signal to the transmitting equipment.

It should be noted that no falling-back process is included in the above described steps (1) through (9) shown in FIG. 2.

Figure 3B:
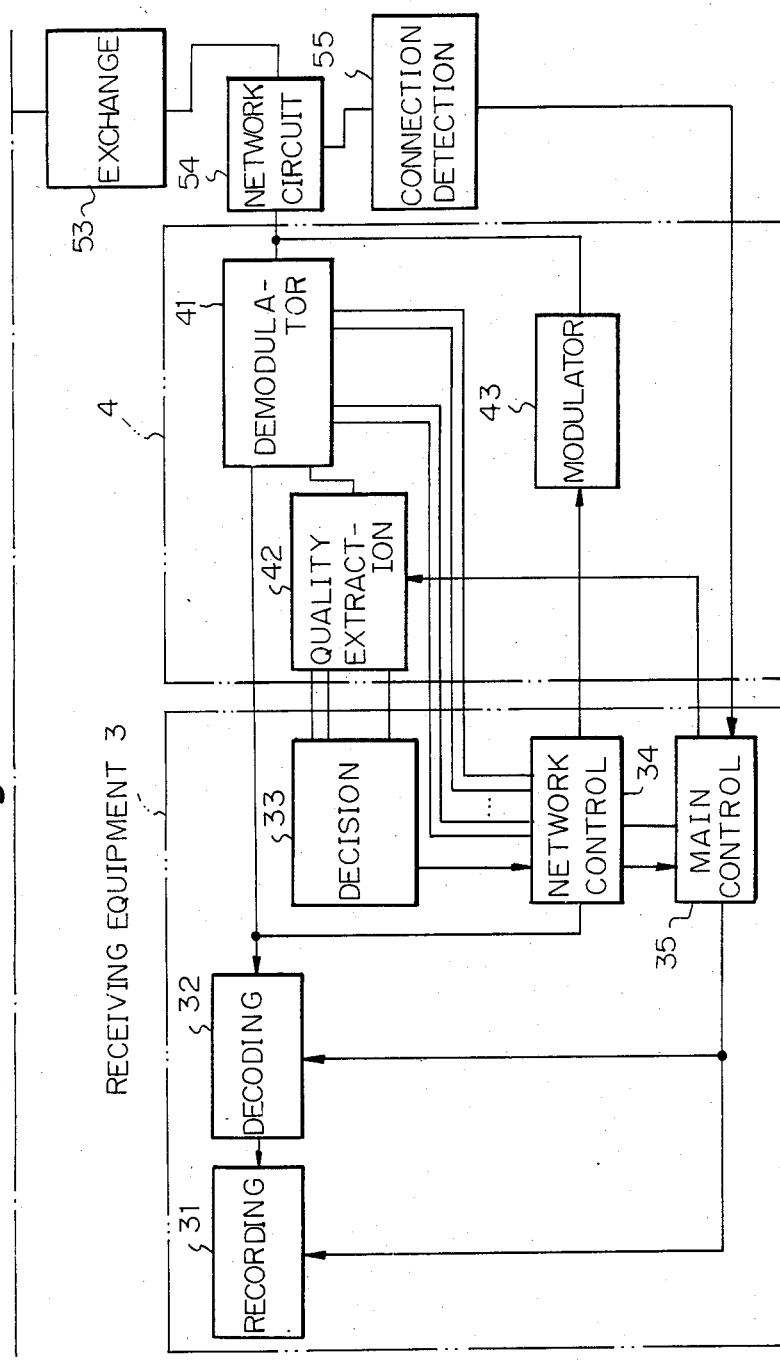

A system for carrying out the sequence of signal transmission processes shown in FIG. 2 is shown in FIG. 3.

The transmitting equipment includes a facsimile device 1 and a MODEM 2. The receiving equipment includes a facsimile device 3 and a MODEM 4. The transmitting equipment is connected through a network control unit 51, an exchange device 53, and a network circuit 54 to the receiving equipment. The network control unit 51 is connected to a telephone 52. A connection detection unit 55 is connected between the network 54 and the facsimile device 3.

The facsimile device 1 includes a reading portion 11, a coding portion 12, a buffer 13, a counter 14, a key portion 15, a main control portion 16, a network control portion 17, and an OR gate 18. The MODEM 2 includes a modulator 21 having a data generation portion 211, and a demodulator 22.

The facsimile device 3 includes a recording portion 31, a decoding portion 32, a decision portion 33, a network control portion 34, and a main control portion 35.

The MODEM 4 includes a demodulator 41, a quality extraction circuit 42, and a modulator 43.

The operation of the system shown in FIG. 3 will now be described.

The operator supplies the information of the telephone number of the receiving equipment to which the picture signal should be transmitted to the network control unit 51. Then the dial signal is supplied to the exchange device 53 from the network control unit 51, and the calling of the receiving equipment is carried out.

Upon receipt of the call signal from the exchange device 53, the network circuit 54 for the receiving equipment makes the network capable of communication. The connection detection unit 55 monitors the signal on the signal line in the network circuit 54. Upon detection of the connection of the network, the connection detection unit 55 transmits the information of the detection to the main control portion 35 of the facsimile device 3.

Upon receipt of the detection information, the main control portion 35 controls the network control portion 34 so that the called station identification signal is supplied to the network circuit 54. The called station identification signal is transmitted from the network circuit 54 through the exchange device 53 and the network control unit 51 to the telephone 52.

The main control portion 35 then supplies the network control portion 34 with the function identification information concerning the facsimile device 3 and the MODEM 4. The network control portion 34 supplies serially the modulator 43 with the supplied function identification information. The modulator 43 modulates a carrier signal on the basis of the supplied function identification information, and the modulated carrier signal is transmitted as the function identification signal from the modulator 43 to the network.

At the side of the transmitting equipment, after acknowledging the called station identification signal, the operator operates the key of the key portion 15 to start the facsimile communication. The operation of the key causes to start the transmission function of the main control portion 16. For the same time, the connection of the network is switched from the telephone 52 to the facsimile device 1 by the network control unit 51, so that the function identification signal transmitted through the network is supplied to the demodulator 22 of the MODEM 2.

After demodulating the supplied function identification signal, the demodulator 22 supplies the network control portion 17 with the demodulated information. The network control portion 17 then supplies the main control portion 16 with the supplied demodulated information.

The main control portion 16 carries out the selection on the basis of the function identification signal supplied from the network control portion 17 to select the function which coincides with the transmission function of the facsimile device 1 and which can transmit the picture signal with the, least time. For example, the MR system as the two dimensional coding system, which has higher compression ability, is selected over the MH system as the one dimensional coding system. The information indicating the result of such selection is supplied from the main control portion 16 to the network control portion 17.

Upon receipt of the selection result information, the network control portion 17 supplies the received selection result information to the OR gate 18 and supplies the signal transmission rate instruction of 300 bps through the signal line 171a. In accordance with this instruction, the modulator 21 delivers to the network the selection result information received from the OR gate 18 with the transmission rate of 300 bps.

After a predetermined time has elapsed from the delivery of the selection result information, the potential of the signal line 171b connected between the network control portion 17 and the modulator 21 is raised.

According to the rising-up of the potential of the signal line 171b, the modulator 21 is operated to deliver the distortion measurement signal. The modulator 21 includes a data generating circuit 211 which generates the data pattern corresponding to the distortion measurement signal. At this moment, the modulator 21 modulates the carrier signal on the basis of the generated data pattern with the modulation system corresponding to a high signal transmission rate. For example, the modulation of the carrier signal on the basis of the data pattern generated from the data generating circuit 211 by the four-phase, phase-modulation system with the signal transmission rate of 4800 bps. The data patterns which can be generated from the data generating circuit 211 consist of a predetermined number of the four-value random code for the entirety of the possible data patterns to be transmitted. The signal delivered from the modulator 21 of the MODEM 2 is transmitted through the network control unit 51, the exchange device 53, and the network circuit 54 to the MODEM 4 of the receiving equipment.

The signal having the transmission rate of 300 bps transmitted from the transmitting equipment is demodulated by the demodulator 41 in the MODEM 4. The demodulated signal is supplied through the network control portion 34 to the main control portion 35.

The main control portion 35 sets up the decoding portion 32 and the recording portion 31, and supplies the network control portion 34 with the instruction that the signal transmission rate of the demodulation of the demodulator 41 should be 4.8 kbps so that the quality extraction circuit 42 is operated. At this moment, the network control portion 34 raises the potential of the signal supplied from the network control portion 34 to the demodulator 41 instructing the demodulation of the signal having the transmission rate of 4.8 kbps.

Upon receipt of the instruction from the network control portion 34, the demodulator 41 demodulates the subsequently received training signal with the demodulation system based on the received instruction, and delivers the signal corresponding to the signal distortion in the network described later.

Upon receipt of the signal from the demodulator 41, the quality extraction circuit 42 supplies the decision portion 33 with the data signal which represents the quality of the signal.

The decision portion 33 consists of a known code conversion device such as a read-only memory (ROM), which selects the optional rate for the signal transmission corresponding to the given data signal and delivers the result of the selection. The output of the decision portion 33 is supplied through the network control portion 34 to the main control portion 35.

On the basis of the supplied output from the decision portion 33, the main control portion 35 supplies the network control portion 34 with the data of the picture signal transmission rate. The network control portion 34 transmits the data of the picture signal transmission rate through the modulator 43 to the MODEM 2 of the transmitting equipment with the transmission rate of 300 bps. For the same time, the main control portion 35 sets the demodulator 41 through the network control portion 34 so as to enable the demodulation of the picture signal having the transmission rate which is being informed to the transmitting equipment.

The demodulator 22 in the MODEM 2 for the transmitting equipment demodulates the received date of the transmission rate for the picture signal. The demodulated data is supplied through the network control portion 17 to the main control portion 16. On the basis of the supplied demodulated data, the main control portion 16 supplies the modulator 21 through the network control portion 17 with the instruction of the transmission with the designated signal transmission rate. The main control portion 16 then operates the reading portion 11 and the coding portion 12.

The reading portion 11 reads the picture from the picture signal source, such as a draft paper which has been preliminarily set in the reading portion 11, and supplies the coding portion 12 with the read picture signal. The coding portion 12 encodes the supplied picture signals successively, and supplies the coded picture signals successively to the buffer 13. It is preferable that the rate of supply of the coded picture signal to the buffer 19 is selected as higher than the highest picture signal transmission rate.

The coded picture signal stored in the buffer 13 is read by the modulator 21 according to the transmission timing signal supplied through the signal line 212a. The modulator 21 delivers the thus read picture signal with the above-designated picture signal transmission rate.

The counter 14 is an up/down counter which is counted up in response to a supply of the coded picture signal from the coding portion 12, and is counted down in response to a supply of the transmission timing signal through the signal line 212a from the modulator 21.

When the count of the counter 14 becomes more than a predetermined number, that is, when a predetermined number of picture signals have been stored in the buffer 13, the counter 14 supplies the reading portion 11 and the coding portion 12 with the instruction for an interruption of procedure. Thus, the counter 14 controls the number of the picture signals stored in the buffer 13 to be always less than a predetermined number.

The picture signal transmitted from the transmitting equipment is supplied through the demodulator 41 to the decoding portion 32 in the facsimile device 3 for the receiving equipment. The decoding portion 32 decodes the supplied picture signal, and the decoded picture signal is supplied to the recording portion 31 where the picture is reproduced on a recording paper.

Figure 4B:
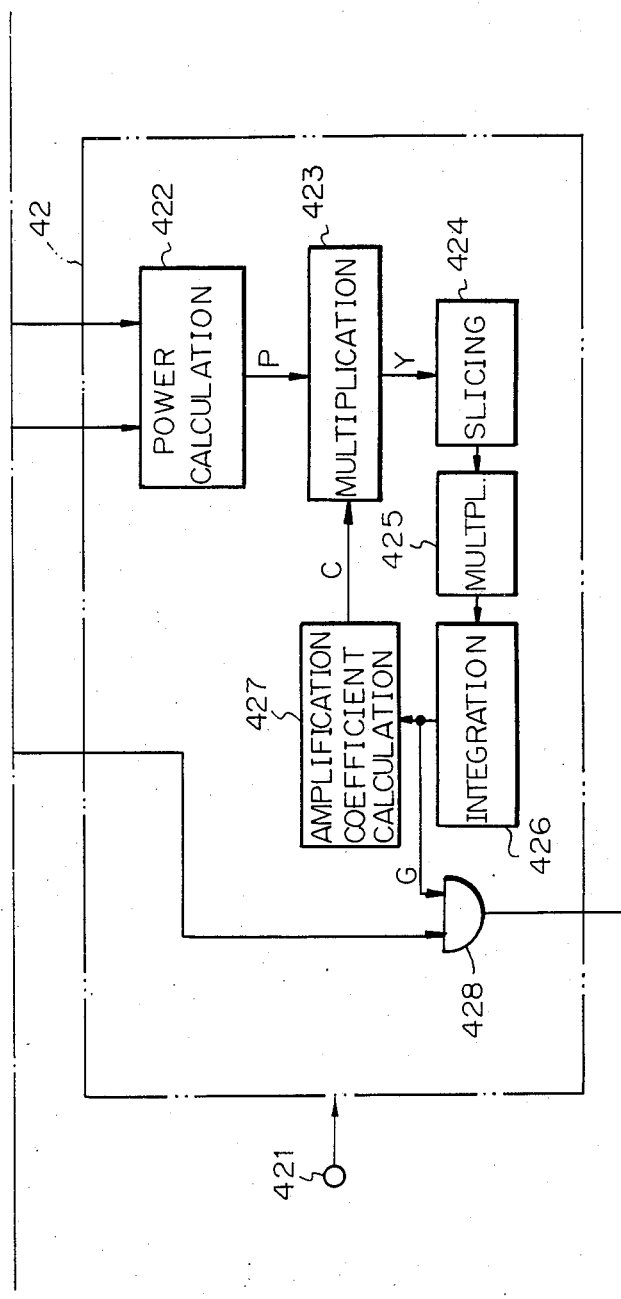

An embodiment of the demodulator 41, the quality extraction circuit 42, and the decision portion 33 shown in FIG. 3 is illustrated in FIG. 4. The demodulator 41 includes demodulation elements 411a, 411b, 411c, ... 411n, corresponding to a plurality of the transmission rates, and an automatic equalizer 412 for equalizing the waveform of the received base band signal to produce the waveform equalized signals S(412r) and S(412i), a decision element 413 for detecting the waveform of the received signal on the basis of the signals S(412r) and S(412i), and the subtraction elements 414 and 415 for carrying out the subtraction between the outputs of the automatic equalizer 412 and the decision element 413 to produce the signals E(i) and E(r) which represent the equalization error of the automatic equalizer 412.

First input terminals of the demodulation elements 411a to 411n receive the received signal supplied from the network circuit 54. Second input terminals of the demodulation elements 411a to 411n receive the instruction signal from the network control portion 34. Only one of the demodulation elements 411a to 411n selected by the instruction from the network control portion 34 will become operable.

The automatic equalizer 412 receives the equalization error indication signals E(i) and E(r), and corrects the equalization coefficient for the equalization of the next base band signal on the basis of the equalization error indication signals E(i) and E(r).

Because of such feedback control for the automatic equalizer 412, where the network reveals relatively good operation characteristics such as less phase jitter, less amplitude variation, or the like, the value of the equalization error signal is reduced as the reception of the transmitted signal proceeds.

Contrary to this, where the network reveals relatively poor operation characteristics, the value of the equalization error signal maintains its large value.

The operation of the circuits shown in FIG. 4 will be explained with reference to FIGS. 5, 6, and 7.

At the beginning, the potential of the input line 411a(2) of the demodulation element 411a is raised according to the instruction of the network control portion 34. Upon the rise of potential of the input line 411a(2), the demodulation element 411a demodulates the training signal received from the transmitting equipment to produce the base band signals S(411r) and S(411i) which are 90° different in phase and correspond to the received base band signals.

The automatic equalizer 412 equalizes the waveforms of the signals S(411r) and S(411i) to produce the equalized signals S(412r) and S(412i). Upon receipt of the equalized signals S(412r) and S(412i), the decision element 413 selects the amplitude and phase values which the received base band signal should have on the basis of the received equalized signals S(412r) and S(412i), to produce the decision output signals S(413r) and S(413i) which are supplied to the coding element 416 and the subtraction elements 414 and 415.

The coding element 416 reproduces the data transmitted from the transmitting equipment on the basis of the amplitude and phase values. The subtraction elements 414 and 415 carry out subtractions between the equalized signals S(412r) and S(412i), and the decision output signals S(413r) and S(413i) to produce the signals S(414) and S(415) which correspond to the obtained differences. The signals S(414) and S(415) are fed-back to the automatic equalizer 412 as the equalization error which the automatic equalizer could not equalize. These differences represent the variation of the distortion measurement signal.

Figure 5:
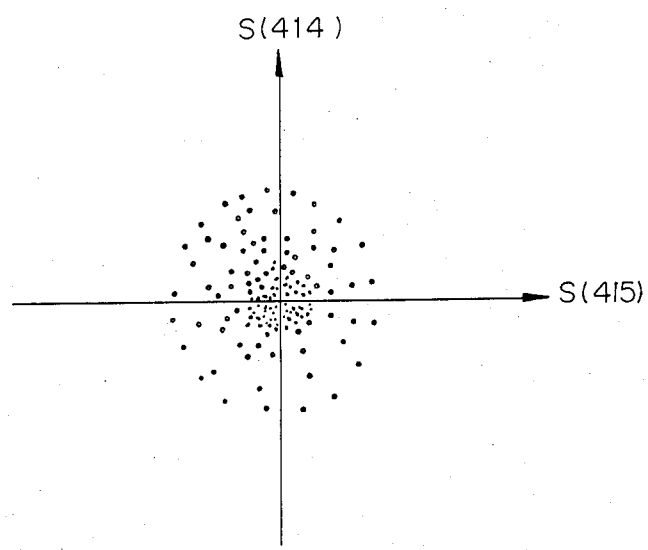
FIG. 5 shows an eye-pattern on the complex number plane for the equalization error signals.

The eye-pattern on the complex number plane for the equalization error signals S(414) and S(415) produced from the subtraction elements 414 and 415 is shown in FIG. 5. In FIG. 5, the abscissa represents S(415) as a real number axis, while the ordinate represents S(414) as an imaginary number axis. As shown in FIG. 5, the points representing the equalization error signals are distributed on the complex number plane assuming the original point to be the center of distribution.

When the signal transmission characteristic in the network is relatively good, the eye which represents distribution is formed so as to tend to be concentrated to the original point. While, when the signal transmission characteristic in the network is relatively poor, the eye which represents distribution is formed so as to tend to be dispersed over the complex number plane.

The equalization error signals S(414) and S(415) are also supplied to the power calculation element 422 in the quality extraction circuit 42 (FIG. 4). The quality extraction circuit 42 starts operation when the potential of the signal supplied to the input terminal 421 of the quality extraction circuit 42 is raised.

The power calculation element 151 sums up the squares of the absolute values of the signals to produce the signal P, which represents the power of the equalization error signal.

Figure 6:
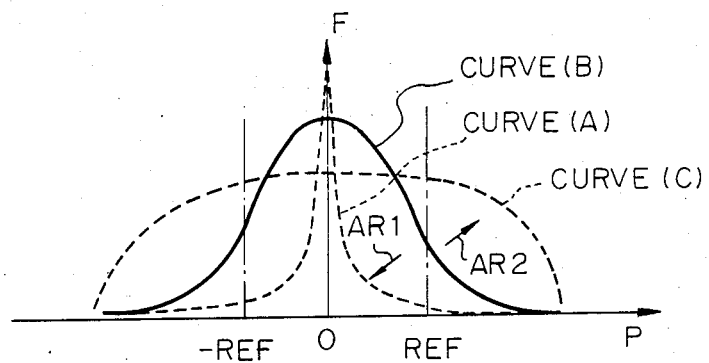
FIG. 6 shows the distribution of the number of occurrences of the value of power with respect to the values of power.

The distribution of the number of occurrences F of the value of the power P is shown in FIG. 6. In FIG. 6, the abscissa represents the power P, while the ordinate represents the number of occurrences F. Although in FIG. 6 the value of P extends over both positive and negative ranges, the value of P is, in practice, only limited within positive range, since the absolute value of P is provided at the output of the power calculation element 422.

In FIG. 6, CURVE(A) represents the state where the signal transmission characteristic in the network is relatively good, CURVE(B) represents the state where the signal transmission characteristic in the network is medium, and CURVE(C) represents the state where the signal transmission characteristic in the network is relatively poor.

Each of CURVE(A), CURVE(B), and CURVE(C) reveals the gaussian distribution. As the signal transmission characteristic in the network becomes better, the distribution curve is changed along the direction indicated by the arrow AR1, while, as the signal transmission characteristic becomes poorer, the distribution curve is changed along the direction indicated by the arrow AR2. Hence, the integrated value along the distribution curve of FIG. 6 is increased as the signal transmission characteristic in the network is deteriorated. Accordingly, the integrated value obtained by integrating the absolute values of the signal represents the degree of distortion. Thus, it is possible to determine the distortion amount by obtaining the above described integrated value.

As described above, it is possible to decide the quality of the signal transmission of the network including MODEMs on the basis of the obtained integrated value.

As shown in FIG. 4, the quality extraction circuit 42 includes a power calculation element 422, a multiplication element 423, a slicing element 424, a multiplication element 425, an integration element 426, an amplication coefficient calculation element 427, and an AND gate 428. The integration element 426 produces the output signal G corresponding to the integrated value.

The multiplication element 423 multiplies the power P from the power calculation element 422 by the amplification coefficient C from the amplification coefficient calculation element 427 to suppress the amplitude of P.

The slicing element 424 produces the output which is the difference between the value of the amplified signal and the reference value REF (FIG. 6). Upon receipt of the signal as expressed by CURVE (C) of FIG. 6, representing the case where the variation of the signal transmission characteristic of the network is large, the slicing element 424 assigns the positive polarity to the difference values within the range from "−REF" to "REF", and assigns the negative polarity to the difference values outside the range from "−REF" to "REF" to produce the output of the thus polarity assigned value, in order to prevent the integrated value from being always in the increasing direction.

The multiplication element 425 carries out the multiplication of decimals, in order to prevent the abrupt change of the integrated value from occurring, even if the variation in the output signal of the slicing portion 424 occurs abruptly.

The integration element 426 integrates the above obtained difference values to produce the integrated value signal G which is supplied to the amplification coefficient calculation element 427 and the AND gate 428.

The amplification coefficient calculation element 427 calculates the amplification coefficient C on the basis of the input signal G from the integration element 426.

It is assumed that Y is the output of the multiplication element 423, S is a control amount having a relatively small value, and N is the order of the quantitized input signal. The following equations are obtained.

$$Y = C \times P \tag{1}$$

where C is the value corresponding to G.

$$G(N+1) = G(N) + \{REF - Y(N)\} \times S \tag{2}$$

where G(N+1) and G(N) are the "N+1"th and Nth order values of G, and Y(N) is the Nth order value of Y.

By making the term "$\{REF - Y(N)\} \times S$" to be close to 0, the value of G converges to a fixed value.

The system consisting of the multiplication element 423, the slicing element 424, the multiplication element 425, the integration element 426, and the amplification element 427 forms a negative feedback control system. Hence, when the operation of this negative feedback control system converges, the value Y(N) becomes as follows.

$$Y(N) \approx REF \tag{3}$$

By introducing the output Y of the multiplication element 423 at the state of convergence into the equation "$Y = C \times P$", the value C corresponding to the state of convergence of the integration element 426 is obtained according to the following equation.

$$C = REF/P \tag{4}$$

Thus, the value of the output of the integration element 426 converges to the value corresponding to equation (4), when the value of the equalization error signal converges to a specific value.

Figure 7:
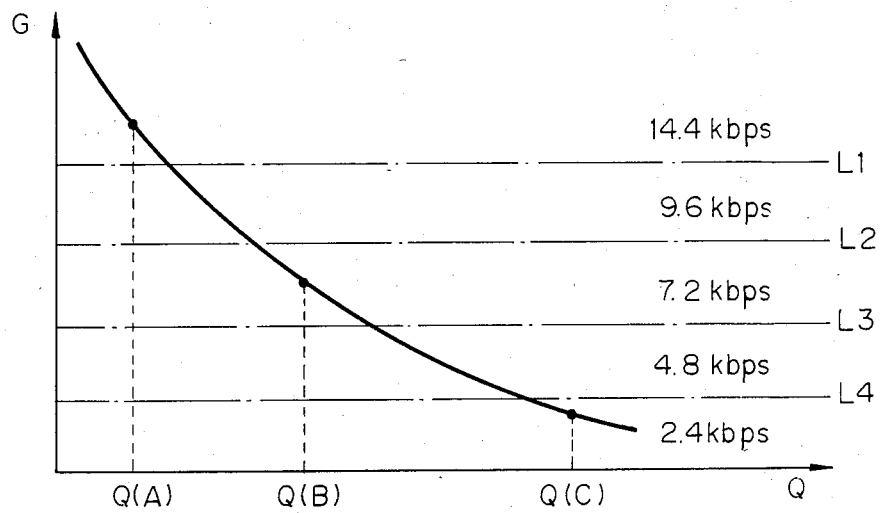
FIG. 7 shows the relationship between the quality of the signal transmission in the network and the output of the integration element.

The relationship between the quality Q of the signal transmission in the network and the output G of the integration element 426 is shown in FIG. 7.

In FIG. 7, points Q(A), Q(B), and Q(C) correspond to CURVE(A), CURVE(B), and CURVE(Q) in FIG. 6, respectively. As can be seen, the output G is small for the quality Q(C) where the quality of the signal transmission in the network is relatively poor and hence a dispersed eye pattern is formed, while the output G is large for the quality Q(A) where the quality of the signal transmission in the network is relatively good and hence an eye pattern concentrated to the original point is formed.

It is known that, usually, the lower the signal transmission, the less affect is caused by the variation of the condition of the network. Hence, it is possible to allot a sequence of transmission rates, i.e., 14.4 kbps, 9.6 kbps, 7.2 kbps, 4.8 kbps, and 2.4 kbps, to the ranges of the output G defined by a sequence of the slice levels L1, L2, L3, and L4, respectively, as illustrated in FIG. 7.

The decision portion 33 includes a read-only memory (ROM) 331. At each of the addresses corresponding to each value of G, a signal transmission rate assigned to each value of G is stored. For example, at the addresses from "00000000" to "00000111" which correspond to the range below slice level L4 in FIG. 7, the signal transmission rate of 2.4 kbps is stored. Also, for example, at the address "00001000" which corresponds to slice level L4 in FIG. 7, the signal transmission rate of 4.8 kbps is stored.

When the above described predetermined number of four value random code signal is received, that is, for example, when the gate 428 is opened in response to the fall of the potential of the carrier detection signal (this potential fall means an interruption of the transmission carrier signal), the output G of the integration element 426 is supplied to the ROM 331 of the decision portion 33.

In response to the application of the signal G through the gate 428 from the integration element 426 to the ROM 331, the signal transmission rate corresponding to the applied signal G is read from the ROM. The read signal transmission rate is delivered from the decision portion 33.

The signal transmission rate data delivered from the decision portion 33 is supplied to the network control portion 34. Thus, the signal transmission rate data delivered from the decision portion is used as the finally decided transmission rate for the picture signal transmission in the system shown in FIG. 3.

Heretofore, it is described that the automatic equalizer 412 equalizes the base band signals which are delivered from all of the demodulation elements 411a, 411b, 411c, . . . 411n, for simplifying the explanation. However, when a plurality of modulation/demodulation systems are adopted, a plurality of combinations of the demodulation element and the automatic equalizer corresponding to such plurality of modulation/demodulation systems are preferably used. Such plurality of modulation/demodulation systems correspond to the different signal transmission rates. For example, the modulation/demodulation system with the transmission rate of 9.6 kbps, 7.2 kbps, or 4.8 kbps is the amplitude phase modulation system according, usually, to the CCITT recommendation V29, while the modulation/demodulation system with the transmission rate of 4.8 kbps or 2.4 kbps is the system according to the CCITT recommendation V27 ter.

It is also possible to transmit the output of the AND gate 428 to the transmitting equipment without going through the decision portion 33.

In the above-described embodiment, a device as a hardware construction illustrated in the block diagram of FIG. 4 is used. However, instead of such a device as a hardware construction, the function of the device shown in FIG. 4 may be achieved by using a microprocessor which performs its function in accordance with a predetermined program.

We claim:

1. A method for transmitting a signal with a signal transmission rate selected from a plurality of signal transmission rates comprising the steps of:

predetermining a plurality of distortion allowance ranges in correspondence with the ranges of signal transmission rate;

transmitting a distortion measurement signal from a transmitting equipment to a line;

receiving said distortion measurement signal from said line, deciding selected values based on said received distortion measurement signal and producing a decided distortion signal;

obtaining a difference between said received distortion measurement signal and said decided distortion signal;

measuring the distortion amount in said obtained difference, at the line, on the basis of the variation in said transmitted distortion measurement signal received by the line;

deciding a distortion allowance range to which said measured distortion amount belongs on the basis of the result of said measurement of the distortion amount, either at the line, or at the transmitting equipment on the basis of the measured distortion amount transmitted from the line; and starting the signal transmission with a transmission rate corresponding to the result of said decision of distortion allowance range.

2. A method according to claim 1, wherein the signal to be transmitted with said transmission rate corresponding to the result of said decision of distortion allowance range is a picture signal.

3. A method according to claim 2, wherein the transmission rate of said distortion measurement signal is one of a plurality of transmission rates for transmitting a picture signal.

4. A method according to claim 3, wherein said distortion measurement signal is a signal obtained by modulating a carrier signal in correspondence with the transmission rate of said distortion measurement signal.

5. A method according to claim 1, wherein said distortion amount of said distortion measurement signal corresponds to the integrated value obtained by integrating the variations in said transmitted distortion measurement signal at a sequence of timings.

6. A method according to claim 5, wherein said decision of said distortion allowance range is carried out by a decision means for converting said distortion amount to information indicating a transmission rate.

7. A method according to claim 6, wherein said decision means is a storing device for storing a transmission rate corresponding to a distortion allowance range to which said distortion amount belongs in storing regions corresponding to distortion amounts.

* * * * *